(12) United States Patent
Wackerly

(10) Patent No.: US 7,924,720 B2
(45) Date of Patent: Apr. 12, 2011

(54) NETWORK TRAFFIC MONITORING

(75) Inventor: Shaun C. Wackerly, Lincoln, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 489 days.

(21) Appl. No.: 11/710,804

(22) Filed: Feb. 26, 2007

(65) Prior Publication Data

US 2008/0205273 A1    Aug. 28, 2008

(51) Int. Cl.
*G06F 11/30*    (2006.01)

(52) U.S. Cl. ............ 370/232; 370/253; 370/392; 726/23

(58) Field of Classification Search .................. 370/229, 370/232, 235; 726/23
See application file for complete search history.

(56) References Cited

U.S. PATENT DOCUMENTS

| | | | |
|---|---|---|---|
| 7,069,588 B2 | 6/2006 | Call et al. | |
| 7,436,770 B2 * | 10/2008 | Sterne et al. | 370/235 |
| 2002/0015384 A1 * | 2/2002 | Huang et al. | 370/231 |
| 2003/0053448 A1 * | 3/2003 | Craig et al. | 370/353 |
| 2004/0215771 A1 | 10/2004 | Hayes | |
| 2005/0108444 A1 | 5/2005 | Flauaus et al. | |
| 2005/0283827 A1 | 12/2005 | Kobayashi | |
| 2006/0075093 A1 * | 4/2006 | Frattura et al. | 709/224 |
| 2006/0075489 A1 * | 4/2006 | Ganguly et al. | 726/22 |
| 2006/0080739 A1 | 4/2006 | Lawton | |
| 2006/0250954 A1 | 11/2006 | Mulrane, Jr. et al. | |

* cited by examiner

*Primary Examiner* — Huy D Vu
*Assistant Examiner* — Maria Sekul

(57) ABSTRACT

Systems, methods, and devices are described that monitor network traffic. One method includes monitoring a number of packets received by a network device based on a number of criteria to determine a flow of the packets. For each monitored packet for a particular source IP address/destination IP address pair, the method includes hashing a destination TCP/UDP port number into a range [0 . . . N]. The method further includes setting a bit in a bit field that has a width of N+1 bits based on the hashing.

20 Claims, 6 Drawing Sheets

400

| Ver | IHL | Type of Service | Total Length | |
|---|---|---|---|---|
| Identification 470 | | | Flag | Fragment Offset |
| TTL | Protocol 430 | | Header Checksum | |
| Source IP Address 420 | | | | |
| Destination IP Address 440 | | | | |
| 450 Source Port | | | Destination Port 460 | |
| Sequence Number | | | | |
| Acknowledgment Number | | | | |
| Offset | Rsv | ECN | Cont. Bits | Window |
| Checksum | | | Urgent Pointer | |

IP Header

TCP Header

*Fig. 4*

NETWORK TRAFFIC MONITORING

BACKGROUND

Computing networks can include multiple network devices such as routers, switches, hubs, servers, desktop PCs, laptops, and workstations, and peripheral devices, e.g., printers, facsimile devices, and scanners, networked together across a local area network (LAN) and/or wide area network (WAN) in a wired and/or wireless fashion.

A given network architecture may wish to treat a certain part of a network, e.g., edge devices, differently from core network devices. Additionally, a given network architecture may wish to treat certain users of the network differently from others in order to maintain integrity of the network.

One way to maintain integrity of a network includes use of an integral intrusion prevention and/or detection system (IPS/IDS) that serves to detect unwanted intrusions/activities to the computer network. Unwanted network intrusions/activities may take the form of attacks through computer viruses and/or hackers, among others, trying to access the network. An intrusion system (IS), e.g., an IPS and/or IDS, may identify different types of suspicious network traffic and network device usage that may not be detected by a conventional firewall. Thus an IS may identify network attacks against vulnerable services, data driven attacks on applications, host based attacks such as privilege escalation, denial of service attacks, port scans, unauthorized logins and access to sensitive files, viruses, Trojan horses, and worms, etc. As used herein "IS" is used to indicate intrusion system(s), i.e., both the singular and plural.

Such integral hardware and software IPS/IDS tools, are expensive. Thus, in previous approaches, to identify suspicious network traffic, an IPS/IDS would only be loaded to a switch, router, hub, etc., in a core part of the network. Moreover, the integral IPS/IDS would only be implemented at the core in an effort to capture the greatest amount of network traffic since data traffic needs to pass through a point of the network where the IPS/IDS is located in order to detect suspicious activity on the network. If an IPS/IDS is not included as part of a switch, router, hub, etc., attacks passing through that network device cannot be detected. Hence, in previous integral approaches the ability to selectively detect such suspicious network traffic within particular parts of a network was either compromised by not having an IPS/IDS local to each device or would effectively require placement of an IPS/IDS at each device location. For large network systems, however, making an IPS/IDS integral to each network device is both expensive to implement and complex to maintain.

In addition to use of an IPS/IDS device, previous approaches have included the use of network appliances that are not truly part of the network. These network appliances are essentially plugged into the network to monitor network traffic at a particular location in the network. Since network appliances are not part of the network infrastructure, they may not be able to selectively monitor traffic in-line with a given network path.

BRIEF DESCRIPTION OF THE DRAWINGS

FIG. 4 provides an example illustration of bit definitions for an IP packet, including the fields within an IP and TCP header.

DETAILED DESCRIPTION

Figure 1:
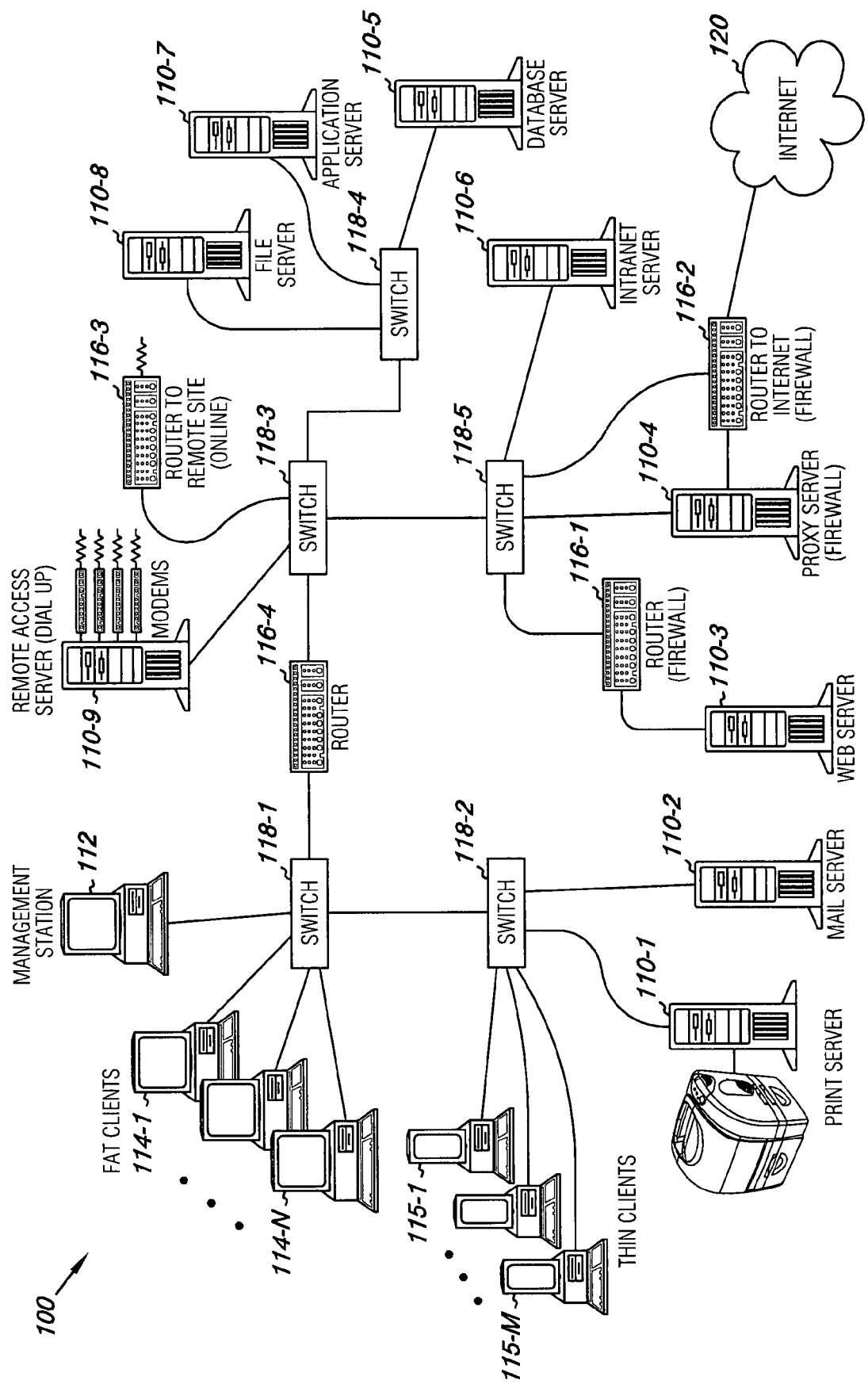
FIG. 1 illustrates an embodiment of a computing device network.

Various embodiments of the invention include systems, methods, and devices, including executable instructions for network traffic monitoring. One method includes monitoring a number of packets received by a network device based on a number of criteria to determine a flow of the packets. For each monitored packet for a particular source IP address/destination IP address pair, the method includes hashing a destination TCP/UDP port number into a range [0 . . . N]. The method further includes setting a bit in a bit field that has a width of N+1 bits based on the hashing.

In various embodiments of the invention a network device, having a processor, memory, and network chip providing a number of ports for the device, includes logic and executable instructions which can selectively monitor network traffic in-line with a network path. The selectively monitored network traffic can include network traffic associated with a particular part of a network and/or particular user's of a network based on a source IP address, a source port identifier, a source VLAN membership, etc. Embodiments are not limited to this example. Instructions on the network device can execute, for the selectively monitored network traffic for a particular source IP address/destination IP address pair, to hash a destination TCP/UDP port number into a range [0 . . . N] and set a bit in a bit field that has a width of N+1 bits associated therewith in order to detect port scanning. Once all of the bits in the bit field have been set, instructions can be executed to perform a remedial action.

Either the network device, and/or a network management station (NMS) networked with the network device, can execute instructions to initiate a remedial action. In various embodiments, instructions are executed to remedially implement a virus throttling technique to restrict port scanning. This can include rate limiting network packet traffic from the particular source through a particular port. The remedial action may also include drop network traffic from the particular source IP address once all of the bits have been set.

As the reader will appreciate, various embodiments described herein can be performed by software, application modules, application specific integrated circuit (ASIC) logic, and/or executable instructions operable on the systems and devices shown herein or otherwise. "Software", as used herein, includes a series of executable instructions that can be stored in memory and executed by the hardware logic of a processor (e.g., transistor gates) to perform a particular task. Memory, as the reader will appreciate, can include random access memory (RAM), read only memory (ROM), non-volatile memory (such as Flash memory), etc. An "application module" means a self-contained hardware or software component that interacts with a larger system. As the reader will appreciate a software module may come in the form of a file and handle a specific task within a larger software system.

A hardware module may be a separate set of logic, e.g., transistor/circuitry gates, that "plug-in" as a card, appliance, or otherwise, to a larger system/device. Embodiments of the present invention, however, are not limited to any particular operating environment or to executable instructions written in a particular language or syntax. Software, application modules and/or logic, suitable for carrying out embodiments of the present invention, can be resident in one or more devices or locations or in several devices and/or locations in a network.

The embodiments of the present disclosure may be implemented in a stand-alone computing system or a distributed computing system. A "distributed computing network" means the use of multiple computing devices in a network to perform various roles in executing instructions, e.g., application processing, etc. As such, FIGS. 1-7 are intended to provide a context for the description of the functions and operations of the present disclosure. That is, the functions and operations described herein may be performed in one or more of the network devices described herein as well as others not specifically described.

Unless explicitly stated, the method embodiments described herein are not constrained to a particular order or sequence. Additionally, some of the described method embodiments can occur or be performed at the same point in time.

FIG. 1 illustrates an embodiment of a computing device network 100. As shown in FIG. 1, a number devices can be networked together in a LAN and/or WAN via routers, hubs, switches and the like. As used herein a "network device" means a switch, router, hub, bridge, etc., i.e., a device having processor understood by one of ordinary skill in the art. Although one network device frequently used in describing exemplary embodiments of the invention is a switch, those skilled in the art will realize that some embodiments of the invention may be implemented with other network devices. As the reader will appreciate, the term network device can also be used to refer to servers, PCs, etc., as illustrated further below.

The example network of FIG. 1 illustrates a print server 110-1 to handle print jobs for the network 100, a mail server 110-2, a web server 110-3, a proxy server (firewall), a database server 110-5, and intranet server 110-6, an application server 110-7, a file server 110-8, and a remote access server (dial up) 110-9. The examples described here do not provide an exhaustive list of servers that may be used in a network.

The embodiment of FIG. 1 further illustrates a network management station 112, e.g., a server, PC and/or workstation, a number of "fat" clients 114-1, . . . , 114-N which can also include PCs and workstations and/or laptops, and a number of "thin" clients 115-1, . . . , 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks via routers, 116-1, 116-2, 116-3, and 116-4, and hubs and/or switches 118-1, 118-2, 118-3, 118-4, and 118-5, as the same are known and understood by one of ordinary skill in the art. The term "network" as used herein is not limited to the types and/or quantity of network devices illustrated in FIG. 1.

As one of ordinary skill in the art will appreciate, many of the network devices (e.g., switches 118-1, 118-2, 118-3, 118-4, 118-5 and/or hubs) can include a processor in communication with a memory and will include network chips having a number of network ports. By way of example and not by way of limitation, the network management station 112 includes a processor and memory. Similarly, network devices such as routers, 116-1, 116-2, 116-3, 116-4, hubs, and/or switches 118-1, 118-2, 118-3, 118-4, 118-5 may include processor and memory resources, along with network chips having hardware logic or application specific integrated circuits (ASICs) associated with ports. Embodiments of the various devices in the network are not limited to a number, type, or size of processor or memory resources.

Program instructions (e.g., computer executable instructions), as described in more detail herein, can reside on the various network devices. For example, program instructions in the form of firmware and/or software can be resident on the network 100 in the memory of a network management station 112 and/or one or more routers, 116-1, 116-2, 116-3, 116-4, hubs, and/or switches 118-1, 118-2, 118-3, 118-4, 118-5, and can be executable by the processor(s) and/or logic (e.g., hardware in the form of transistor gates) thereon. Also, program instructions can be resident in a number of locations on various network devices in the network 100 as can be employed in a distributed computing network.

As one of ordinary skill in the art will appreciate, each network device in the network 100 can be physically associated with a port of a switch to which it is connected. Data packets pass through the network. Users physically connect to the network through these ports. Data frames, or packets, can be transferred between network devices by means of a switch's logic link control (LLC)/media access control (MAC) circuitry, or "engines", associated with ports on a network device, e.g., switch. A network switch forwards data frames received from a transmitting network device to a destination network device based on the header information in received data packets. The switch can also forward packets from a given network to other networks through ports on one or more other switches.

Figure 2:
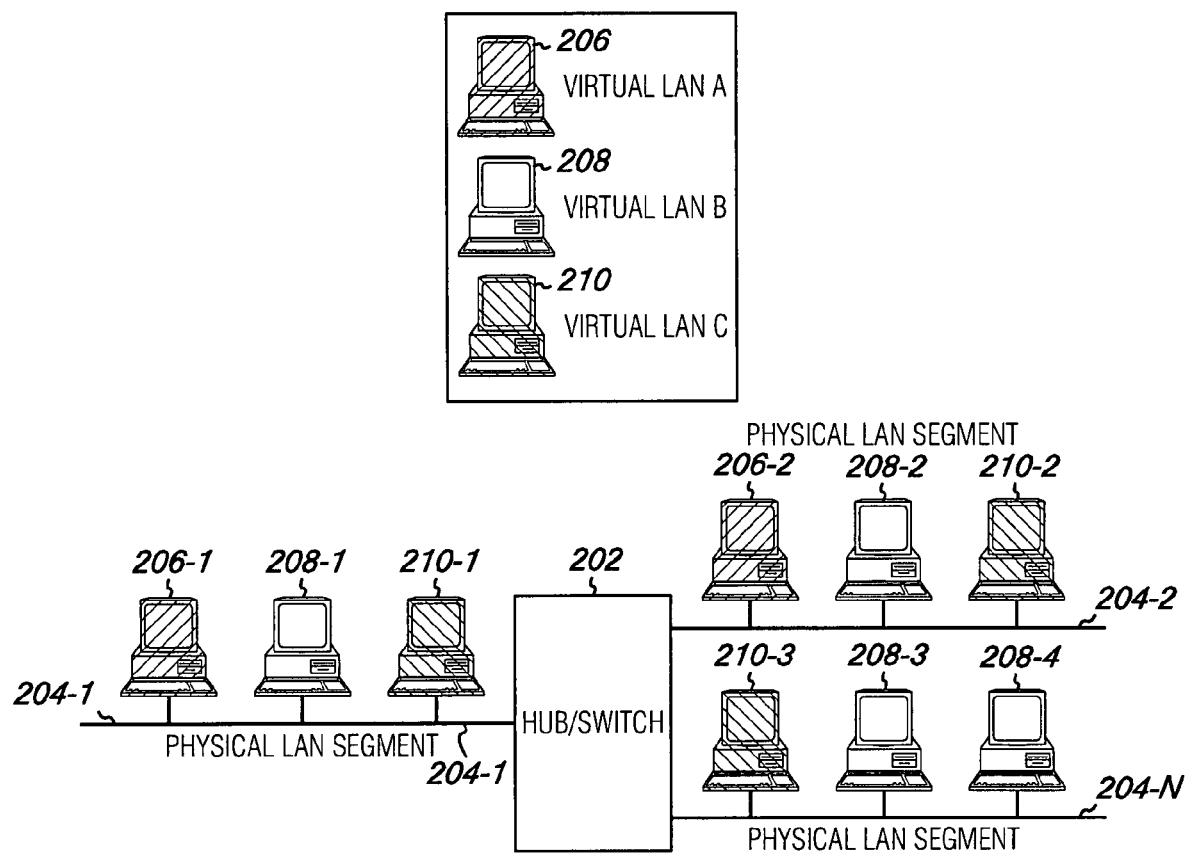
FIG. 2 is an illustration showing various VLAN logical subgroups relative to various physical LAN segments to which multiple network devices are attached.

FIG. 2 is an illustration showing various VLAN logical subgroups, e.g., virtual LAN A 206, virtual LAN B 208, virtual LAN C 210, relative to various physical LAN segments, e.g., 204-1, 204-2, . . . , 204-N, to which multiple network devices, e.g., 206-1, 206-2, 208-1, 208-2, 208-3, 208-4, 210-1, 210-2, 210-3, are attached. One feature of packet switches, e.g., 202, used in LAN applications, such as Ethernet switches, is that the switches 202 actually can segregate a network into a number of virtual local area networks (VLANs), e.g., virtual LAN A 206, virtual LAN B 208, virtual LAN C 210.

In the VLAN mode of operation, the switches, e.g., 202, of a packet network transport frames or packets back and forth between network devices, e.g., 206-1, 206-2, 208-1, 208-2, 208-3, 208-4, 210-1, 210-2, 210-3, designated as members of a particular VLAN, e.g., virtual LAN A 206, virtual LAN B 208, virtual LAN C 210. The switches, e.g., switch 202, of the network do not transport the packets for the VLAN members, e.g., virtual LAN A 206, virtual LAN B 208, virtual LAN C 210, to other network devices, e.g., 206-1, 206-2, 208-1, 208-2, 208-3, 208-4, 210-1, 210-2, 210-3 not belonging to that particular LAN. In other words, switch 202 will transport packets for VLAN A member 206 to network devices 206-1, and 206-2, but not others. Switch 202 will transport packets for VLAN B 208 to network devices 208-2, 208-2, 208-3, and 208-4, but not others. And, switch 202 will transport packets for VLAN C 201 to network devices 210-1, 210-2, and 210-3, but not others.

In this manner, the capability exists for creating logical workgroups of users and their shared resources (servers, printers, etc.), which may be physically separated from each other. Members of a workgroup may be coupled directly with one switch in the LAN, while other members or equipment of the workgroup may be coupled to one or more remote networks that are linked to the switch at a designated port. VLAN groupings, e.g., virtual LAN A 206, virtual LAN B 208, virtual LAN C 210, can provide privacy and security to their members while enabling "broadcast domains" whereby broadcast traffic is kept "inside the VLAN, e.g., virtual LAN A 206, virtual LAN B 208, virtual LAN C 210.

As the reader will appreciate, where a given switch, e.g., 202, implements two or more VLANs, e.g., virtual LAN A 206, virtual LAN B 208, virtual LAN C 210, the switch, e.g., 202 has to distinguish packets for members of one VLAN from packets for members of a different VLAN and from packets for devices not associated with any one VLAN. All VLAN frames may be tagged with data identifying the particular VLANS. Hence, data packets communicating within a VLAN, e.g., virtual LAN A 206, virtual LAN B 208, virtual LAN C 210, may contain information that identifies the VLAN grouping, or VLAN type, and the particular VLAN ID. Such information, or "tag," is provided as additional fields in the frame header. The frame format for such packets is expanded relative to the standard frame format. For example, the IEEE 802.3ac-1998 supplement to the Ethernet ANSI/IEEE 802.3 standard (1998 Edition) specifies the tagged and untagged frame formats, and the P802.1Q Draft standard specifies the semantics of tagged frames. As the reader will appreciate, according to these formats a port may be tagged on a number of VLANs, but untagged on only one VLAN. In this manner a network can be subdivided into a particular subgroup and/or set of users.

Figure 3:
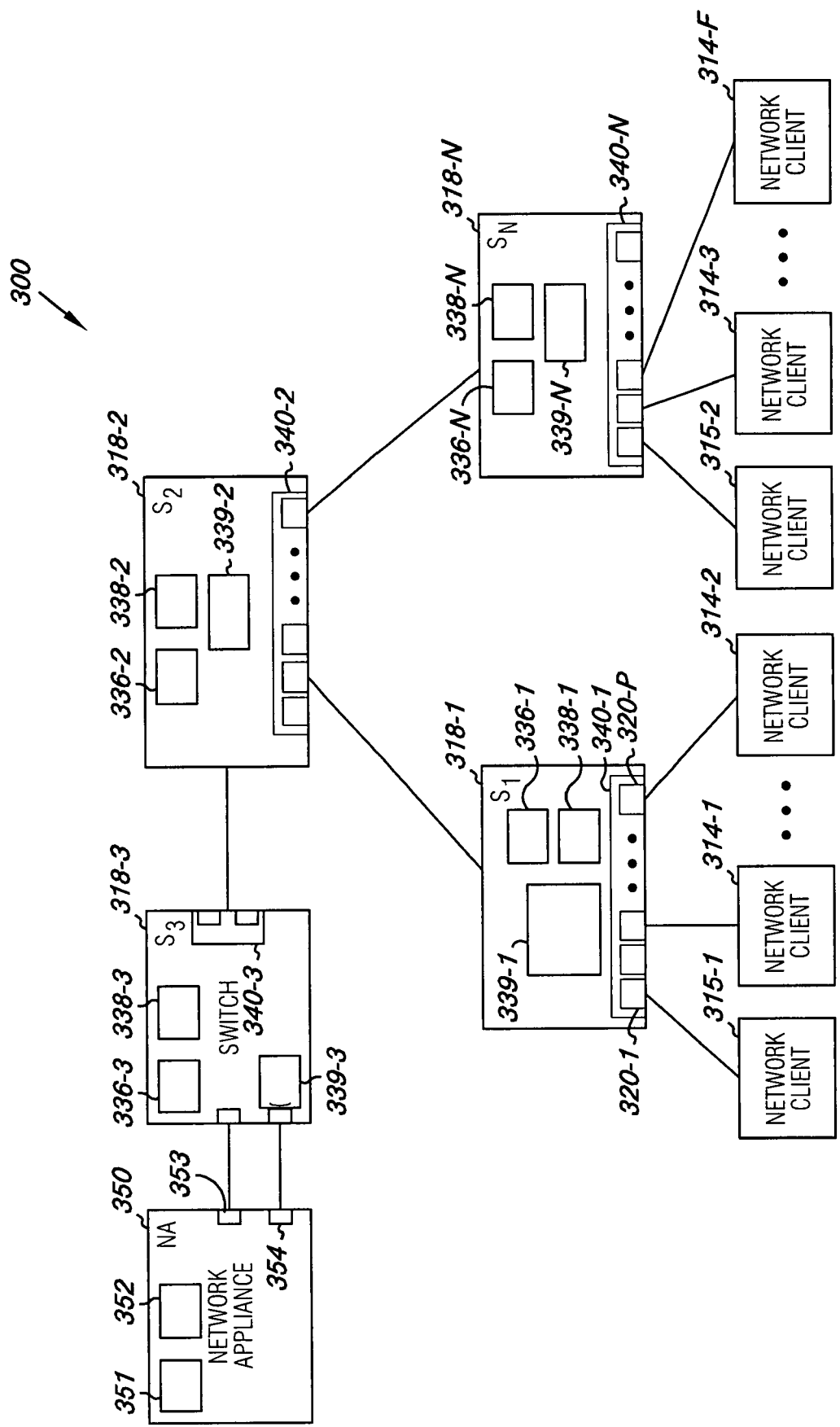
FIG. 3 illustrates a portion of a network including network devices in which embodiments of network traffic monitoring can be implemented.

FIG. 3 illustrates a portion 300 of a network, e.g., network 100, shown in FIG. 1, including embodiments of various network devices, 318-1, 318-2, ... 318-N suited to implement embodiments of the invention. By way of illustration and not by way of limitation, various network devices can be considered edge network devices, e.g., 318-1 and 318-N, having ports connected directly to network clients, e.g., 315-1, 315-2, ..., 314-1, ... 314-F. The network clients can include "fat" and "thin" clients as discussed above in connection with FIG. 1. Additionally, "fat" an "thin" clients, 315-1, 315-2, ..., 314-1, ... 314-F, can be members of particular VLANS, as described above in connection with FIG. 2, and have a particular port link status, etc. Additionally, by way of illustration and not by way of limitation, various network devices can be considered central network devices, e.g., 318-3, which may be connected to other network devices, e.g., 318-2, but which might not be connected directly to network clients, 315-1, 315-2, ..., 314-1, ... 314-F.

As described in connection with FIG. 1, the various network devices, 318-1, 318-2, ... 318-N, can include switches, routers, hubs, etc. (shown as switches in FIG. 3). Such network devices, 318-1, 318-2, ... 318-N, can include processor, e.g., 336-1, ..., 336-N, and memory, e.g., 338-1, ..., 338-N, resources. The network devices, 318-1, 318-2, ... 318-N, can similarly include a number of network chips, e.g., 340-1, ..., 340-N, including logic circuitry (hardware) which can execute instructions and each network chip, 340-1, ...,

340-N, can include a number of network ports, 320-1, 320-2, ..., 320-P to send and receive data packets (network traffic) throughout the network 300. The logic circuitry of the number of network chips, e.g., 340-1, ..., 340-N, can be in the form of an application specific integrated circuit (ASIC) and include logic to serve as a media access controller (MAC).

As shown in FIG. 3, the number of ports 320-1, 320-2, ..., 320-P can be included on a network chip 340-1, ..., 340-N and have access to logic circuitry associated with a network chip 340-1, ..., 340-N and to the processor 336-1, ..., 336-N and memory 338-1, ..., 338-N through a crossbar, crosslink, and/or switching fabric 339-1, ..., 339-N as the same will be understood by one of ordinary skill in the art. As used herein, the designators "N", "F" and "P" are used to illustrate that various networks can have a various number of network devices, various numbers of network clients, and various network devices in a network may support or contain a various and/or different number of ports. Embodiments are not limited to the example shown in FIG. 3.

As shown in the embodiment of FIG. 3, a network appliance 350 can be connected to a network device, e.g., 318-3, which may be a central network device. As used herein, the term "network appliance" is used to refer to an add-on, e.g., "plug-in", device to a network 300 as contrasted with a "network device". Network devices are devices such as routers, switches, and/or hubs, etc., which are sometimes considered more as "backbone" component devices to a network. As shown in FIG. 3, the network appliance 350 can includes processor 351 and memory 352 resources capable of storing and executing instructions to perform a particular role or function.

As described above, previous approaches to preventing suspicious activity, e.g., port scanning, on a network included loading an IPS and/or IDS to a switch, router, hub, etc., in a core part of the network. Such a software and/or hardware tool would be expensive and complex to maintain. Sometimes a integral IPS/IDS is implemented only at the core of a network in an effort to limit cost while capturing the greatest amount of network traffic. However, such approaches may not be selective and may still not effectively detect all suspicious activity since data traffic needs to pass through a point of the network where the IPS/IDS is located in order to detect suspicious activity. Beyond an IPS/IDS device, previous approaches include the use of network appliances, described above, that are not truly part of the network. These network appliances are essentially plugged into the network to monitor network traffic at a particular location in the network and may be deployed more readily to a number of edge network devices yet still may not selectively monitor traffic. Moreover, for large network systems, either approach can be expensive to implement and very complex to maintain. Further, since network appliances are not part of the network infrastructure, they may not be able to selectively monitor traffic in-line with a given network path.

According to embodiments of the present disclosure, logic can be provided to the ASIC of a network chip, 340-1, ..., 340-N. Additionally, executable instructions can be provided to the processor 336-1, ..., 336-N and memory 338-1, ..., 338-N resources of a given device, 318-1, 318-2, ... 318-N. As such, instructions on a given network device, 318-1, 318-2, ... 318-N, can be executed to monitor a number of packets received to a port, 320-1, 320-2, ..., 320-P, on the given network device 318-1, 318-2, ... 318-N based on a number of criteria to determine an IP flow of the packets. As the reader will appreciate an IP flow is identified by a source IP address and a destination IP address, e.g., a pair of IP addresses.

In various embodiments, the number of criteria to monitor a number of packets includes a source IP address, a source port, a source VLAN, etc. One of ordinary skill in the art will appreciate the manner in which instructions on a given network device, 318-1, 318-2, . . . 318-N, can be executed to monitor packets received by the given network device 318-1, 318-2, . . . 318-N based on the source IP address, the source port, the source VLAN, etc. FIG. 2 illustrated the manner in which a network can be divided into a sub-network according to a particular portion of the network and/or particular users of the network. Hence, a network for a college campus could be divided up between professors, administrators, students, buildings, etc., and instruction executed on a device 318-1, 318-2, . . . 318-N to monitor a number of packets received by the given network device, based on a number of criteria, source IP address, source port, source VLAN, etc., to determine an IP flow of the packets.

FIG. 4 provides an example illustration of bit definitions for an IP packet, including the fields within an IP and TCP header 400. As described above in connection with FIG. 3, network traffic in the form of packets including header 400 can be received by a network device, e.g., 318-1, 318-2, . . . 318-N, such as a switch or router, and can be examined by instructions executing in connection with the logic link control (LLC)/media access control (MAC) circuitry associated with the ASIC of a network chip, 340-1, . . . , 340-N.

In various embodiments, the instructions can execute to extract information from the various fields of packet headers, e.g., header 400, which can be used for purposes such as determining whether packets correspond to the number of criteria, e.g., the source IP address 420, the source port 450, the source VLAN 470, etc. Additionally, the instruction can execute to monitor, based on the IP flow, those packets which meet the criteria by extracting information from the various fields of the IP header which correspond to the IP flow, i.e., the IP source address 420 and the IP destination address 440.

FIG. 4 illustrates the numerous header fields that can examined by instructions executing on the network device 318-1, 318-2, . . . 318-N either at the layer 2 data link (MAC) layer or at the layer 3 network layer of the TCP/IP protocol stack, as the same will be recognized by one of ordinary skill in the art. As shown in FIG. 4, this TCP/IP header information includes a protocol field 430, a source IP address field 420, a destination IP address field 440, a source port field 450, and a destination port field 460, etc.

According to embodiments of the present disclosure, hardware and/or software executable instructions on a given network device, 318-1, 318-2, . . . 318-N, can be executed, for each monitored packet for a particular source IP address/destination IP address pair, to hash a destination TCP/UDP port number (DP), e.g., 460 in FIG. 4, into a range [0 . . . N]. The instructions can then be executed to set a bit in a bit field that has a width of N+1 bits in order to detect port scanning in connection with a particular source IP address. Once all of the bits in the bit field have been set, instructions can be executed to perform a remedial action as described in more detail below.

One of ordinary skill in the art will appreciate the manner in which set of computer executable instructions can be stored in memory 338-1, . . . , 338-N and executed by a processor 336-1, . . . , 336-N of a network device 318-1, 318-2, . . . 318-N to perform a hashing algorithm to hash a destination TCP/UDP port number (DP), e.g., 460 in FIG. 4, of a monitored packet for a particular source IP address/destination IP address pair, into a range [0 . . . N] and to set a bit in a bit field that has a width of N+1 bits based on the hashing.

According to various embodiments, either the network device, and/or a network management station (NMS) networked with the network device, can execute instructions to initiate the remedial action. In various embodiments, instructions are executed to remedially implement a virus throttling technique to restrict port scanning. This can include rate limiting network packet traffic, associated with a particular source IP address 420/destination IP address 420 pair, received to a network device 318-1, 318-2, . . . 318-N through a port 320-1, 320-2, . . . , 320-P. One example of virus throttling by rate limiting network packet traffic from a particular source IP address is provided in copending, commonly assigned US Patent Publication No. 2006/0250954, by Edward M. Mulrane, Jr., entitled, "Method and Apparatus for Controlling Connection rate of Network Host, which is incorporated herein be reference. The remedial action may also include executing instructions to drop network packet traffic, associated with a particular source IP address 420/destination IP address 420 pair, once all of the bits have been set. One of ordinary skill in the art will also appreciate the manner in which hardware and/or software executable instructions on a given network device, 318-1, 318-2, . . . 318-N, can be executed to drop network packet traffic, associated with a particular source IP address 420/destination IP address 420 pair, once all of the bits have been set.

Thus, as illustrated by the embodiment of FIG. 3, a network device 318-1, 318-2, . . . 318-N, having a processor 336-1, . . . , 336-N, memory 338-1, . . . , 338-N, and network chip 340-1, . . . , 340-N providing a number of ports 320-1, 320-2, . . . , 320-P for the device, includes logic and executable instructions which can selectively monitor network traffic in-line with a network path. The selectively monitored network traffic can include network traffic associated with a particular part of a network and/or particular user's of a network based on a source IP address 420, a source port identifier 450, a source VLAN membership 470, etc. Embodiments are not limited to the example embodiment of FIG. 3.

Figure 5:
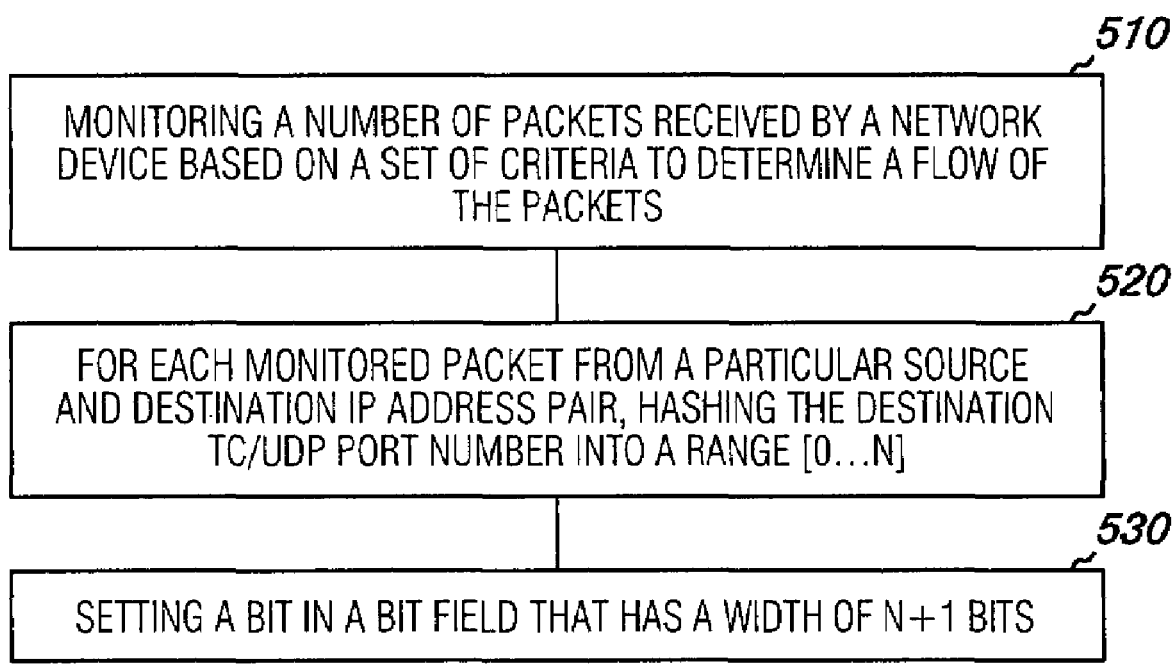
FIG. 5 illustrates a method embodiment.

FIG. 5 illustrates one embodiment 500 of a method embodiment of monitoring network traffic. As shown at block 510 in the embodiment of FIG. 5, one method includes monitoring a number of packets received by a network device based on a number of criteria to determine an IP flow of the packets. As described above in connection with FIG. 3, in one particular embodiment the number of packets can be monitored based on logic associated with the ASIC of a network chip, 340-1, . . . , 340-N and executable instructions associated with the processor 336-1, . . . , 336-N and memory 338-1, . . . , 338-N resources of a given device, 318-1, 318-2, . . . 318-N. According to various embodiments the instructions on a given network device, 318-1, 318-2, . . . 318-N, can be executed to monitor a number of packets received to a port, 320-1, 320-2, . . . , 320-P, on the given network device 318-1, 318-2, . . . 318-N based on a source IP address, a source port, a source VLAN, etc. The instructions can then executed to determine an IP flow, e.g., source IP address and destination IP address, of the packets.

As described above in FIGS. 2 and 3, a network can be divided into a sub-network according to a particular portion of the network and/or particular users of the network. Hence, according to various embodiments, the portion the network in FIG. 3 could represent a portion of a college campus network with network device 318-1 being an edge switch connected to student clients, 315-1, 314-1, 314-2, etc. The switch 318-1 can receive packets from these source clients, 315-1, 314-1, 314-2, and have been configured, as described above, to monitor packets from the same. According to embodiments, for the monitored packets on switch 318-1, the instructions execute to determine the IP flow of those packets. That is, the instruction can execute to monitor, based on the IP flow, those packets which meet the criteria by extracting information from the various fields of the IP header which correspond to the IP flow, i.e., the IP source address 420 and the IP destination address 440.

For each monitored packet for a particular source IP address 420 and destination IP address 440 pair, the instructions execute to hash a destination TCP/UDP port number into a range [0 . . . N], as shown at block 520. That is, the instructions can execute to hash a destination TCP/UDP port number belonging to one or more ports on another network device, e.g., switches 318-2, . . . , 318-N, and/or another network client, 315-2, . . . , 314-F.

As represented by block 530 in the embodiment of FIG. 5, the method includes setting a bit in a bit field that has a width of N+1 bits. For example, in some embodiments, setting the bit field is based on hashing the destination TCP/UDP port number (e.g., DP hash field) in association with a packet received for that particular source IP address 420/destination IP address 440 pair. As described above, one of ordinary skill in the art will appreciate the manner in which the instructions can execute to continue to monitor packets associated with a particular SA, source port, and/or source VLAN, and hash the DP of packets for a particular source IP address 420/destination IP address 440 pair over a period of time to continue setting bits in the DP hash field in order to detect suspicious activity, e.g., port scanning.

In another embodiment, the same steps describe above with reference to FIG. 5 are performed but the method additionally includes executing a remedial action once all the bits in a given DP hash field have been set. This may be all the bits set in a particular period of time. As described in more detail below, one of ordinary skill in the art will appreciate the manner in which instructions on a given device, e.g., 318-1, can execute to track a particular period of time. The particular period of time may be network configurable. Additionally, one of skill in the art will appreciate the manner in which instructions can be provided to the device, e.g., 318-1, to hash DPs received in packets associated with a particular source IP address 420/destination IP address 440 pair into a range [0 . . . N]. That is, the particular range [0 . . . N] can also be network configurable according to the particular SA, source port, source VLAN, e.g., portion of a network, being monitored.

Figure 6:
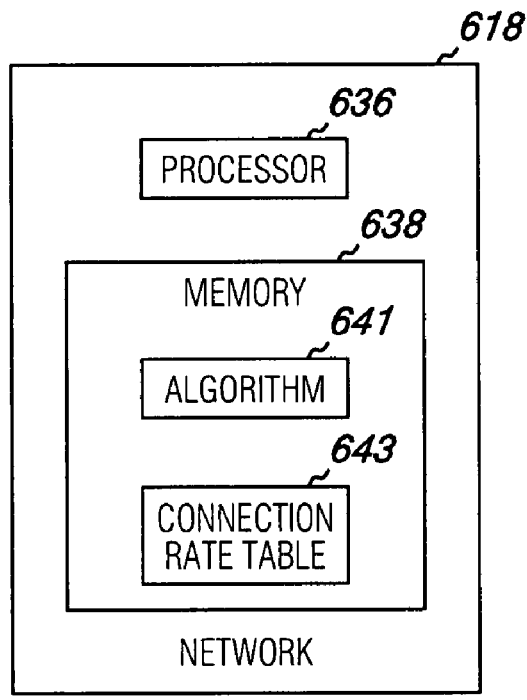
FIG. 6 is a block diagram of a network device, such as a device in a portion of the network in FIG. 3, in which embodiments of the invention can be implemented.

FIG. 6 is a block diagram of a network device 618 in a portion of a network, e.g., switch 318-1 in FIG. 3, implementing embodiments of the present disclosure. As shown in the embodiment of FIG. 6, the network device 618 can include processor 636 and memory 638 resources. Computer executable instructions, e.g., algorithm 641, are stored in memory 638 and executable by the processor 636 in association with tracking suspicious activity, e.g., port scanning, as can be reflected all the bits in a given DP hash field having been set in a particular period in order to trigger a remedial action. In the example embodiment of FIG. 6, the instructions are executed to hash DPs associated with a particular source IP address 420/destination IP address 440 pair. As shown in FIG. 6, the instructions can execute to track whether all of the bits in a DP hash field have been set in a particular period of time with reference to a connection rate table 643 in order to determine whether to initial a remedial action, e.g., to determine whether to allow or prevent data connections to the intended destinations from the particular source. As the reader will appreciate, the connection rate table 643 can be stored in memory 638. The connection rate table can keep track of the number of outgoing connection attempts and the last time a connection attempt had been made in association with a particular source IP address 420/destination IP address 440 pair, with reference to a DP hash field.

Figure 7:
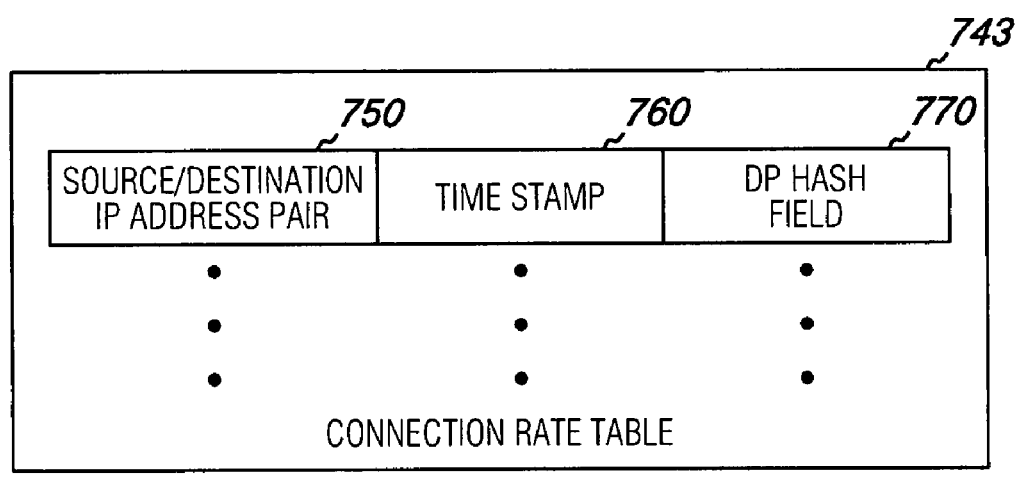
FIG. 7 is a diagram illustrating an embodiment of a table for tracking flow to a particular destination address to restrict port scanning.

FIG. 7 illustrates in more detail an embodiment of a connection rate table 743 for tracking flow to a particular destination address according to embodiments of the present disclosure. As shown in the example embodiment of FIG. 7, the connection rate table 743 can includes a number of DP hash field entries 770 for data packets previously transmitted in association with a particular source IP address/destination IP address pair, 750 and received by the particular network device, e.g., switch 618 in FIG. 6. As shown in the embodiment of FIG. 7, the DP hash field entries 770 can be indexed using the particular source IP address/destination IP address pair 750, so that receipt of all data packets for a particular IP flow are recorded to the same entry in the table 724.

As shown, in addition to the particular source IP address/destination IP address pair 750 information, each of the DP hash field entries 770 includes a timestamp field 760 for recording the timestamp indicating the time the last data packet, associated with this particular source IP address/destination IP address pair field 750 and this particular DP hash field 770, had been received by the network device for keeping track of the number of outgoing connection attempts and the last time a connection attempt had been made in association with the particular source IP address/destination IP address pair 750, in reference to the DP hash field.

As described above, the DP hash field 770 has a width of N bits, which can be network configurable according to the particular SA, source port, source VLAN, e.g., portion of a network, being monitored along with the time stamp 760. Hence, all the bits in a DP hash field 770 may be set once an average of 20 outgoing connection attempts are made within one second, or when an average of 50 outgoing connection attempts are made within one second, etc. The former would be a more "sensitive" setting. As described herein, each time a data packet is transmitted in connection with a particular source IP address/destination IP address pair 750 through the network device, e.g., 618 in FIG. 6, to a particular DP, e.g., destination TCP/UDP port number, a bit is set in the DP hash field 770.

By way of example and not by way of limitation, one example operation includes a network device, e.g., 318-1 in FIG. 3, being configured to monitor packets associated with particular source addresses, source ports, source VLANs, etc., e.g., associated with network clients 315-1, 314-1, . . . , 314-2, in communication with other network devices, 318-2, . . . , 318-N, and other network clients, 315-2, . . . , 314-F, e.g., destination TCP/UDP port numbers (DPs) through a network. When a particular monitored source address, source port, source VLAN, etc., e.g., associated with network clients 315-1, 314-1, . . . , 314-2, makes an outgoing connection attempt through the network device 318-1, to a given destination TCP/UDP port number, a data packet transmitted by the particular monitored source is received by the network device, 318-1, and processed by the logic and/or instructions described herein. According to embodiments described herein, the instructions execute to hash the destination TCP/UDP port number in connection with a particular source IP address/destination IP address pair 750 into the range [0 . . . N]. The instructions will then execute to set a bit in the DP hash field, e.g., 770 in FIG. 7 and update and/or create an entry in the connection rate table, e.g., 724 in FIG. 7, for the particular monitored source, e.g., 315-1, 314-1, . . . , 314-2, transmitting the received data packet. The instructions will additionally execute to enter a timestamp in the timestamp field, e.g., 760 indicating the current time the data packet is received by the network device 318-1.

If an entry for the for the particular monitored source, e.g., 315-1, 314-1, . . . , 314-2, transmitting the received data packet already exists in the connection rate table, the timestamp in the timestamp field 760 of the entry is compared with a current time. Instructions on the device can execute to determine whether the difference between the current time and the timestamp in the timestamp field 760 is less than a configurable threshold time. If not, the DP hash field 770 can be cleared, i.e., reset to zero, and the timestamp field 760 is updated to the current time. The data packet is then forwarded to the destination TCP/UDP port number indicated in the data packet. In other words, if the difference between the current time and the timestamp in the timestamp field 760 is greater than the configurable threshold rate, then can be determined that the present outgoing connection attempt is not made in connection with suspicious port scanning activity. This is because one characteristic of port scanning involves the action of attempting to make many different and/or repeated destination TCP/UDP port number connections within short period of time, which characteristic is not displayed when the difference between the current time and the timestamp is greater than the configured threshold. If a particular monitored source, e.g., 315-1, 314-1, . . . , 314-2, is not behaving in this manner, the data packet is forwarded by the network device 318-1 to the destination TCP/UDP port number indicated in the data packet.

If, on the other hand, the difference between the current time and the time stamp 760 is less than the rate threshold, instructions will execute to hash the destination TCP/UDP port number in connection with a particular source IP address/destination IP address pair 750 into the range [0 . . . N] and set a bit in the DP hash field entry 770 for the particular monitored source, e.g., 315-1, 314-1, . . . , 314-2, transmitting the data packet. As the reader will appreciate, a hash function that provides a uniform distribution for a set of network destination TCP/UDP port numbers (DPs) in connection with a particular source IP address/destination IP address pair 750 is utilized to set a specific bit within the DP hash field 770. Also, the timestamp field 760 is reset to the current time. Instructions will execute to examine the DP hash field 770 to determine whether all N bits are set. If not, the data packet is forwarded to the intended destination TCP/UDP port number.

According to various embodiments, however, if all N bits are set, instructions can execute to throttle or rate limit the data packet, i.e., hold and transmit at a substantially slower rate than the rate at which the data packets are being transmitted from the particular monitored source, e.g., 315-1, 314-1, . . . , 314-2, or blocked entirely and not sent to its destination TCP/UDP port number at all, i.e. the data packet is discarded (dropped). Subsequent data packets from the same particular monitored source, e.g., 315-1, 314-1, . . . , 314-2, may likewise be throttled or blocked until a predetermined time period has elapsed, the rate of traffic from the particular monitored source, e.g., 315-1, 314-1, . . . , 314-2, has decreased, or the network device 318-1 is directed to allow traffic from the particular monitored source, e.g., 315-1, 314-1, . . . , 314-2 to be forwarded uninhibited.

Hence, when a data packet is received in less threshold time from the previous data packet from the same the particular monitored source, e.g., 315-1, 314-1, . . . , 314-2, to one or more particular destination TCP/UDP port numbers (DPs) and this is repeated a predetermined number of times in connection with a particular source IP address/destination IP address pair 750, it is an indication that the particular monitored source, e.g., 315-1, 314-1, . . . , 314-2, sending these data packets may be port scanning. A given network device 318-1 may then either throttle the rate at which data packets from the particular monitored source, e.g., 315-1, 314-1, . . . , 314-2, can be sent, or block all subsequent data packets from the particular monitored source, e.g., 315-1, 314-1, . . . , 314-2, until a network administrator explicitly re-enables traffic flow from that particular monitored source, e.g., 315-1, 314-1, . . . , 314-2.

It is to be understood that the above description has been made in an illustrative fashion, and not a restrictive one. Although specific embodiments have been illustrated and described herein, those of ordinary skill in the art will appreciate that other component arrangements and device logic can be substituted for the specific embodiments shown. The claims are intended to cover such adaptations or variations of various embodiments of the disclosure, except to the extent limited by the prior art.

In the foregoing Detailed Description, various features are grouped together in a single embodiment for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed:

1. A method of monitoring network traffic, comprising:
monitoring a number of packets received by a network device based on a number of criteria to determine a flow of the packets;
for each monitored packet, for a particular flow, hashing a destination TCP/UDP port number into a range [0 . . . N] based on the particular flow, wherein N is a number of ports being monitored;
setting a bit in a bit field that has a width of N+1, wherein a location of the bit set in the bit field is based upon the hashed destination TCP/UDP port number; and
rate limiting network traffic associated with the particular source IP address and the particular destination IP address pair, once all the bits in the bit field have been set.

2. The method of claim 1, wherein the method includes executing a remedial action once all the bits in the bit field have been set.

3. The method of claim 1, wherein the method includes monitoring the packets received by a switch based on a particular virtual local area network (VLAN) membership.

4. The method of claim 1, wherein the method includes monitoring the packets received by a switch based on a particular set of port addresses.

5. The method of claim 1, wherein the method includes monitoring the packets received by a switch based on a particular source address.

6. The method of claim 1, wherein the method includes hashing the destination TCP/UDP port number into a range [0 . . . N] and setting the bit in the bit field that has the width of N+1 bits in order to detect port scanning.

7. The method of claim 2, wherein executing the remedial action once all of the bits have been set includes dropping packets from the particular source IP address.

8. The method of claim 2, wherein executing the remedial action once all of the bits have been set includes rate limiting a port link for packets from the particular source IP address.

9. A network device, comprising:
a processor;
a memory in communication with the processor;
a network chip having a number of network ports for the device, the network chip including logic to execute instructions and having access to the processor and memory; and
wherein the instructions are executed to:
- selectively monitor network traffic in-line with a network path;
- for selectively monitored network traffic, for a particular source IP address and a particular destination IP address pair, hash the destination TCP/UDP port number into a range [0 . . . N], wherein N is a number of ports being monitored;
- set a bit in a bit field that has a width of N+1, wherein a location of the bit set in the bit field is based upon the hashed destination TCP/UDP port number; and
- rate limit network traffic associated with the particular source IP address and the particular destination IP address pair, once all the bits in the bit field have been set.

10. The network device of claim 9, wherein the instructions are executed to monitor a number of packets received by a network device based on a number of criteria.

11. The network device of claim 9, wherein the instructions are executed to monitor the number of packets based on a source IP address.

12. The network device of claim 9, wherein the instructions are executed to monitor the number of packets based on a source port identifier.

13. The network device of claim 9, wherein the instructions are executed to monitor the number of packets based on a source VLAN membership.

14. The network device of claim 9, wherein the instructions are executed to hash the destination TCP/UDP port number, associated with the particular source IP address and the particular destination IP address pair, into a range [0 . . . N] and set the bit in the bit field that has the width of N+1 bits in order to detect port scanning.

15. The network device of claim 9, wherein the instructions execute to drop network traffic, associated with the particular source IP address and the particular destination IP address pair, once all of the bits have been set.

16. A network monitoring system, comprising:
a network device including a processor coupled to a memory and a network chip having a number of network ports for the device, the network chip including logic to execute instructions and having access to the processor and memory, and wherein the instructions are executed to:
- monitor a number of packets received by a network device based on a number of criteria to determine an IP flow of the packets;
- for each monitored packet, for a particular source IP address and a particular destination IP address pair, hash a destination TCP/UDP port number (DP) into a range [0 . . . N], wherein N is a number of ports being monitored; and
- set a bit in a bit field that has a width of N+1, wherein a location of the bit set in the bit field is based upon the hashed destination TCP/UDP port number; and
a network management station (NMS) networked with the network device, the NMS including a memory coupled to a processor, and computer executable instructions stored in memory and executable by the processor to execute a remedial action once all of the bits in the bit field have been set.

17. The system of claim 16, wherein the instructions are executed to remedially implement a virus throttling technique to restrict port scanning.

18. The system of claim 17, wherein the instructions are executed to rate limit a port link to the network device for packets associated with the particular source IP address and the particular destination IP address pair, once all the bits in the bit field have been set.

19. The system of claim 17, wherein the instructions are executed to:
- monitor the number of packets received by the network device based on a criteria selected from the group of a source address, a source port, and a source VLAN, to determine the IP flow; and
- rate limit a port link based on the particular source IP address and the particular destination IP address pair, a time stamp, and the hashed DP.

20. The system of claim 17, wherein the instructions are executed to:
- monitor the number of packets received by the network device based on a criteria selected from the group of a source address, a source port, and a source VLAN, to determine the IP flow; and
- drop packets received to the network device based on the particular source IP address and the particular destination IP address pair, a time stamp, and the hashed DP once all the bits in the bit field have been set.

* * * * *

UNITED STATES PATENT AND TRADEMARK OFFICE
CERTIFICATE OF CORRECTION

PATENT NO. : 7,924,720 B2
APPLICATION NO. : 11/710804
DATED : April 12, 2011
INVENTOR(S) : Shaun C. Wackerly et al.

It is certified that error appears in the above-identified patent and that said Letters Patent is hereby corrected as shown below:

In the Claims:

In column 12, line 39, in Claim 1, delete "N+1," and insert -- N+1 bits, --, therefor.

In column 13, line 16, in Claim 9, delete "N+1," and insert -- N+1 bits, --, therefor.

In column 14, line 12, in Claim 16, delete "N+1," and insert -- N+1 bits, --, therefor.

Signed and Sealed this
Seventh Day of May, 2013

Teresa Stanek Rea
*Acting Director of the United States Patent and Trademark Office*